(12) United States Patent
Wang et al.

(10) Patent No.: US 6,181,390 B1
(45) Date of Patent: *Jan. 30, 2001

(54) DISPLAY HOLDER WITH MULTIPLE SIDE FRAMES

(75) Inventors: Ping-Hsien Wang; Yu-Hsin Chuo; Yu-Jing Lin, all of Taipei (TW)

(73) Assignee: Compal Electronics, Inc., Taipei (TW)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/238,497

(22) Filed: Jan. 27, 1999

(51) Int. Cl.$^7$ ....................................................... G02F 1/133
(52) U.S. Cl. ............................... 349/58; 361/681; 349/59
(58) Field of Search ........................ 349/58, 59; 361/681, 361/682, 683, 752, 759, 736, 727

(56) References Cited

U.S. PATENT DOCUMENTS

| | | | |
|---|---|---|---|
| 3,718,842 | * 2/1973 | Abbott, III et al. | 361/681 |
| 4,616,295 | * 10/1986 | Jewell et al. | 362/31 |
| 5,835,139 | * 11/1998 | Yun et al. | 349/58 |

* cited by examiner

Primary Examiner—Kenneth Parker
(74) Attorney, Agent, or Firm—Bacon & Thomas

(57) ABSTRACT

A liquid crystal computer display structure including a liquid crystal display panel two sides of which are respectively locked with two fixing plates. At least one supporting plate is locked with the fixing plates. A liquid crystal display circuit board is locked on the supporting plate. Each side of the display panel is fitted with a side frame. The side frames are structurally identical to each other, while having different lengths. A metal back cover is disposed on back side of the display circuit board for reducing electromagnetic interference.

2 Claims, 5 Drawing Sheets

DISPLAY HOLDER WITH MULTIPLE SIDE FRAMES

BACKGROUND OF THE INVENTION

The present invention relates to a liquid crystal computer display structure, and more particularly to a liquid crystal computer display which has simplified structure and thinner thickness.

FIG. 1 shows a conventional liquid crystal computer display in which a fixing board 102 is disposed on back side of the display panel 100 for fixing thereon a liquid crystal display circuit board 104. A cover body 106 is mounted on back side of the circuit board 104 for reducing electromagnetic interference with the circuit board 104. A back cover 108 is fitted on rearmost side of the display panel 100.

The above conventional liquid crystal computer display has complicated structure and is considerably thick.

SUMMARY OF THE INVENTION

It is a primary object of the present invention to provide a liquid crystal computer display which has thinner thickness and simplified structure. Each side of the display panel is fitted with a side frame for reinforcing the display panel. The side frames are structurally identical to each other, while only having different lengths so that the manufacturing cost is relatively low.

The present invention can be best understood through the following description and accompanying drawings, wherein:

DETAILED DESCRIPTION OF THE PREFERRED EMBODIMENT

Figure 1:
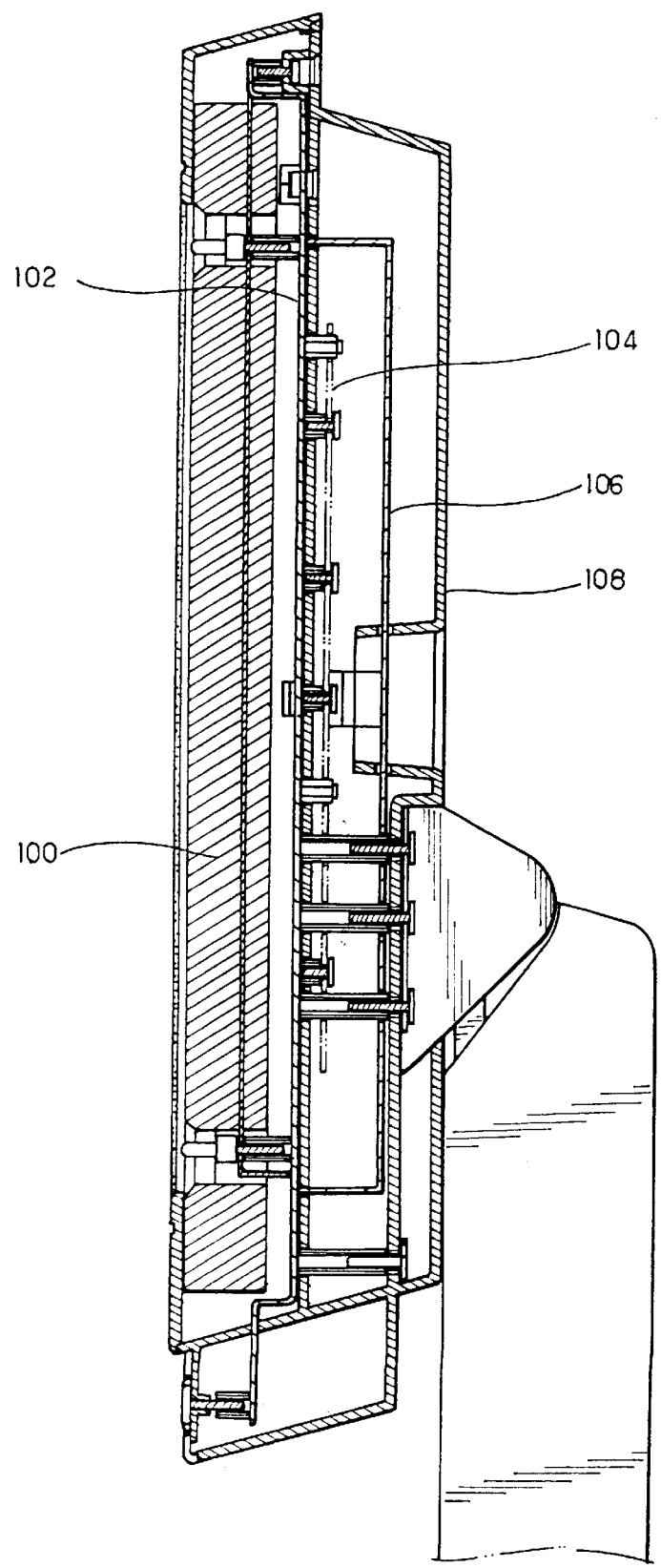
FIG. 1 is a side sectional view of a conventional liquid crystal computer display.
Figure 2:
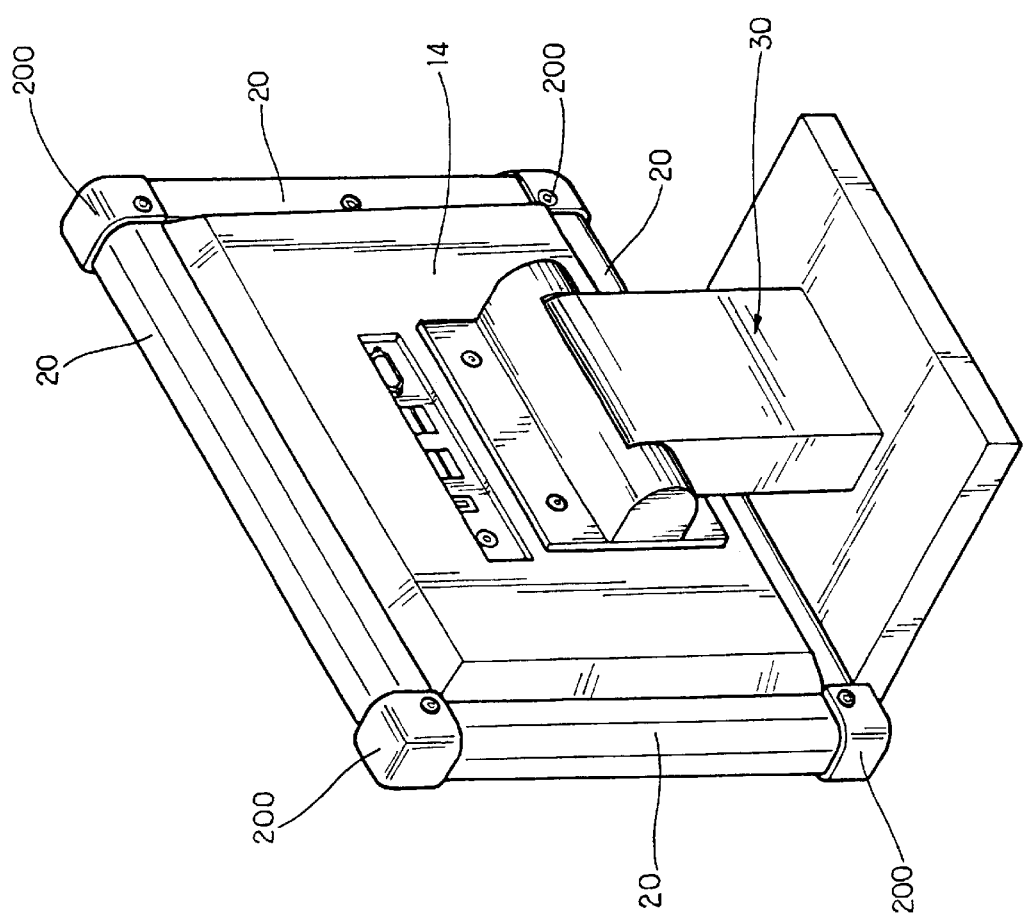
FIG. 2 is a perspective view of the liquid crystal computer display of the present invention.
Figure 3:
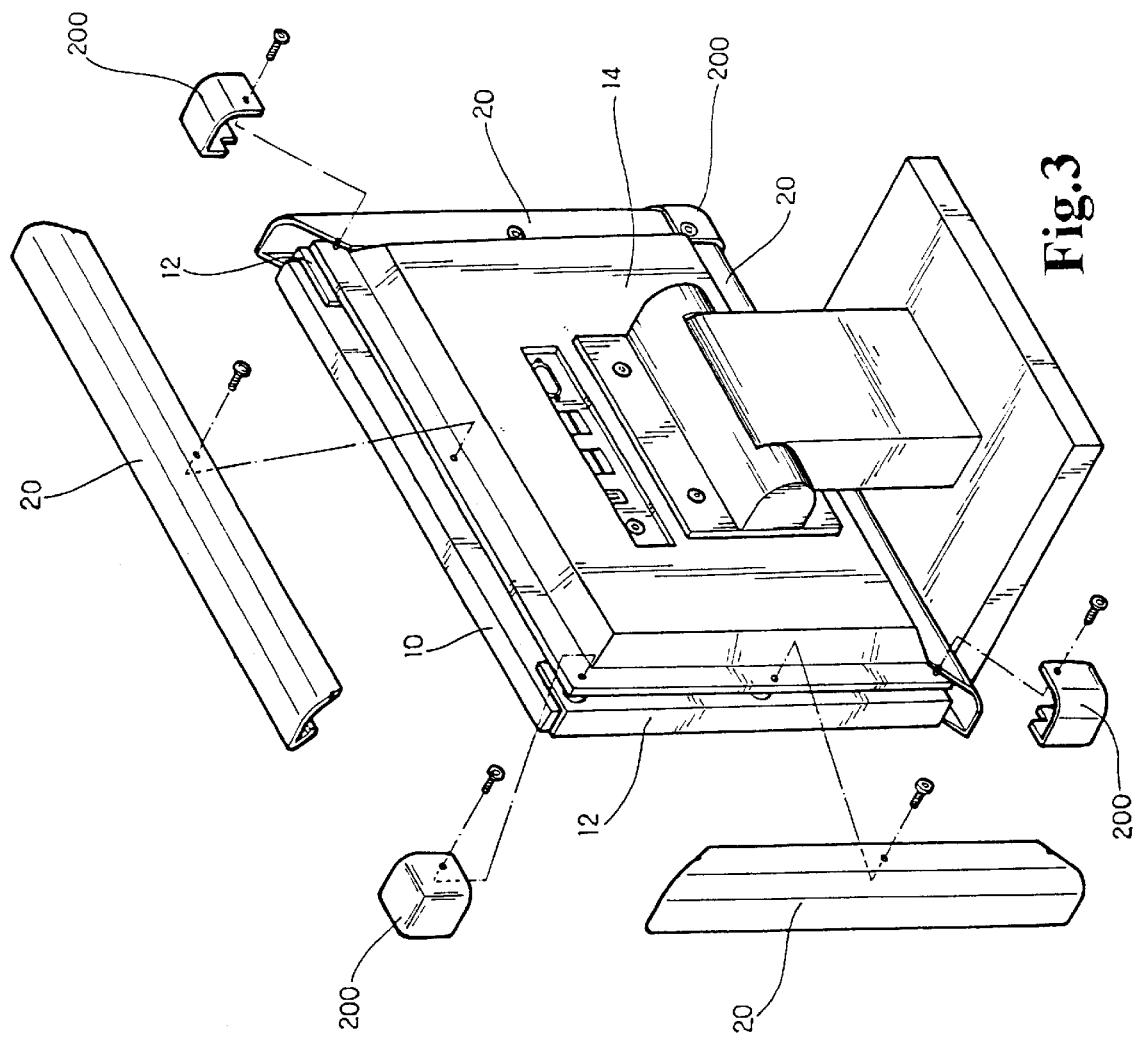
FIG. 3 is a perspective exploded view according to FIG. 2.
Figure 4:
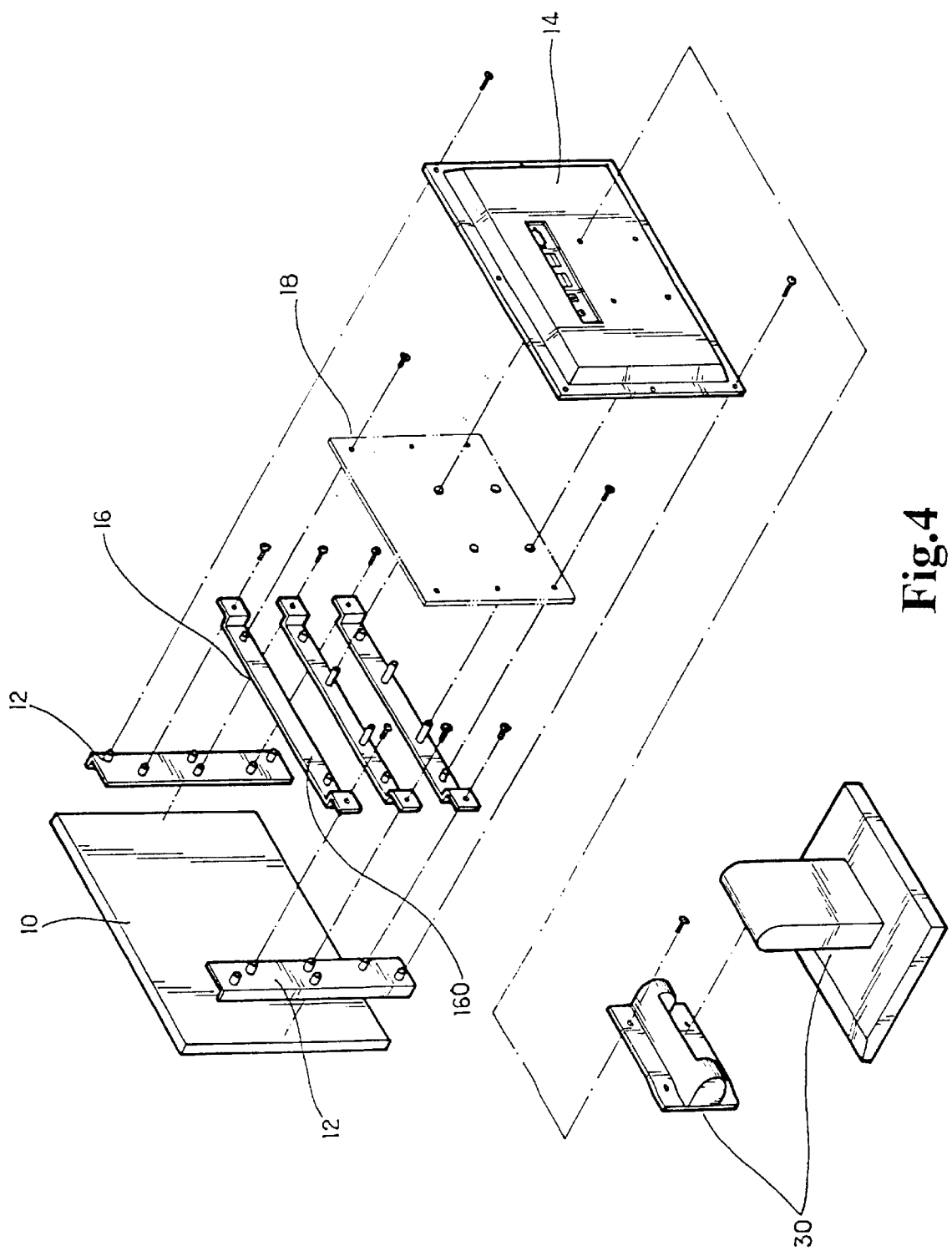
FIG. 4 is a perspective exploded view of a part of the liquid crystal computer display of the present invention.
Figure 5:
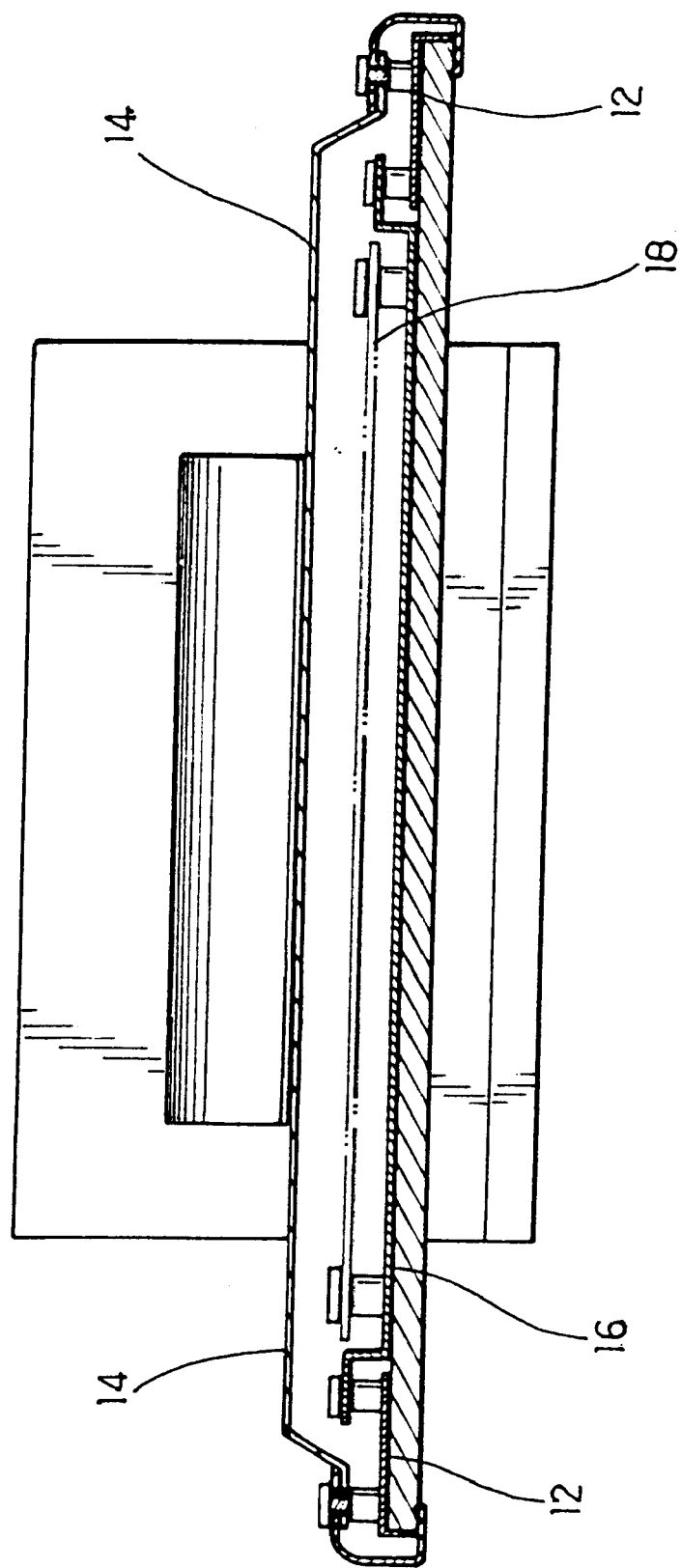
FIG. 5 is a partially sectional view of the liquid crystal computer display of the present invention.

Please refer to FIGS. 2 and 3. The present invention includes a display panel 10. Each lateral side of the display panel 10 is locked with a substantially L-shaped fixing plate 12 fixedly connected with several supporting plates 16. In this embodiment, there are three (not limited to three in actual application) supporting plates 16. Two ends of each supporting plate 16 are respectively locked with the L-shaped fixing plate 12. The supporting plate 16 is formed with a middle recess 160 in which the liquid crystal display circuit board 18 is locked. Accordingly, the thickness of the liquid crystal display can be reduced. The circuit board 18 serves to provide display signals for the liquid crystal display panel 10.

A back side of the L-shaped fixing plate 12 is disposed with a metal back cover 14 covering the circuit board 18 for effectively reducing electromagnetic interference.

Referring to FIG. 3, the periphery of the liquid crystal display panel 10 is fitted with side frames 20 each of which is a substantially U-shaped structure. The respective side frames 20 are different from each other only in length so that the manufacturing cost is relatively low. The adjacent side frames 20 are connected with each other by an adapter 200 for reinforcing the side frames 20 and the liquid crystal display panel 10. Furthermore, the back cover 14 is made of metal material so that the display panel 10 can be firmly retained on a stand 30.

It should be noted that the above description and accompanying drawings are only used to illustrate one embodiment of the present invention, not intended to limit the scope thereof. Any modification of the embodiment should fall within the scope of the present invention.

What is claimed is:

1. A liquid crystal computer display structure comprising:

a liquid crystal display panel two sides of which are respectively attached to two fixing plates;

at least one supporting plate attached to the fixing plates;

a liquid crystal display circuit board interlocked on the supporting plate;

multiple side frames respectively fitted with each side of the display panel wherein each side of said display panel has a separate side frame attached thereto, said side frames being attached to each other by adapters, with the proviso that the only difference permitted between said side frames is in their length; and a metal back cover locked on the fixing plates.

2. A liquid crystal computer display structure as claimed in claim 1, wherein the supporting plate is formed with a middle recess in which the liquid crystal display circuit board is interlocked for reducing the thickness of the display.

* * * * *